United States Patent [19]
Dzus, Sr. et al.

[11] 3,816,883
[45] June 18, 1974

[54] FASTENER

[75] Inventors: Theodore Dzus, Sr.; Peter Schenk, both of West Islip, N.Y.

[73] Assignee: Dzus Fastener Co., Inc., West Islip, N.Y.

[22] Filed: Jan. 4, 1973

[21] Appl. No.: 320,882

[52] U.S. Cl............................ 24/221 R, 24/73 RM
[51] Int. Cl............................................. A44b 17/00
[58] Field of Search........... 24/221 A, 221 R, 73 RM

[56] References Cited
UNITED STATES PATENTS

| | | | |
|---|---|---|---|
| 2,250,072 | 7/1941 | Tinnerman | 24/221 A |
| 2,397,889 | 4/1946 | Taylor | 24/221 A |
| 2,421,204 | 5/1947 | Jung | 24/221 A |
| 3,486,205 | 12/1969 | Smith | 24/222 R |

Primary Examiner—Bernard A. Gelak
Attorney, Agent, or Firm—Kane, Dalsimer, Kane, Sullivan and Kurucz

[57] ABSTRACT

A quick release fastener used for fastening together two parts such as panels. The fastener consists of two components, a stud and a receptacle. The receptacle is molded from a resilient plastic material and includes two C-shaped supporting webs terminating at one end in engagement with an integral base portion and at the other end in engagement with a retaining portion. The retaining portion has a socket with cam surfaces to cooperate with lugs on the stud. The resilient member is collapsible laterally to permit its partial insertion in an aperture on a support and designed so that when it is released it will return to its initial configuration affixing the receptacle to the support. The relationship between the base and the C-shaped loops is dimensionally adjusted so that the receptacle is adapted to be mounted in a variety of different thickness panels.

6 Claims, 7 Drawing Figures

PATENTED JUN 18 1974 3,816,883
SHEET 1 OF 2
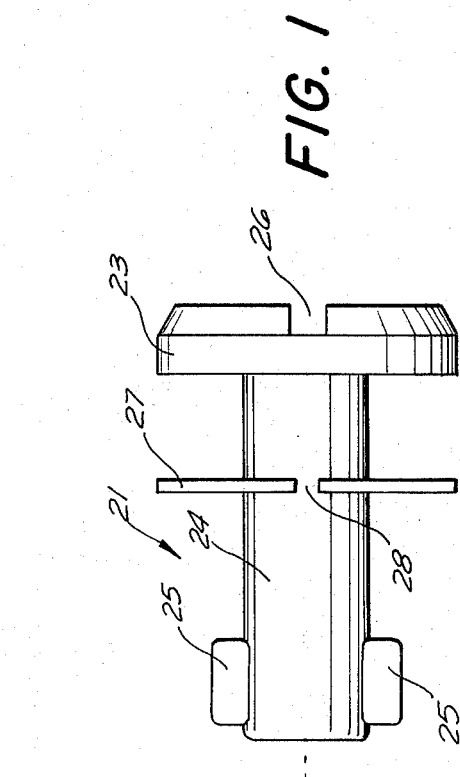
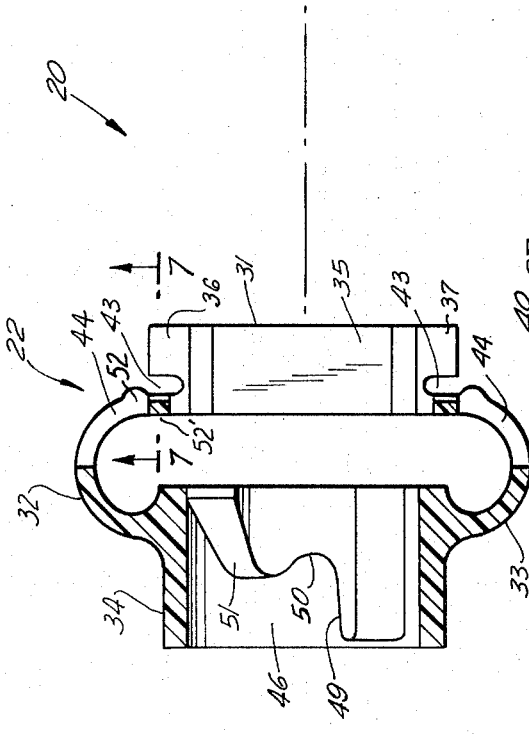
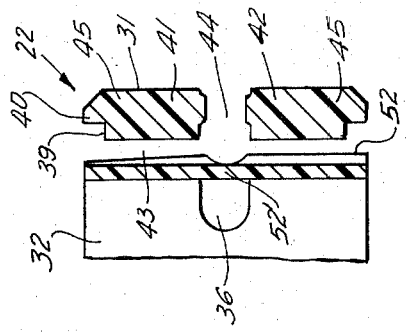
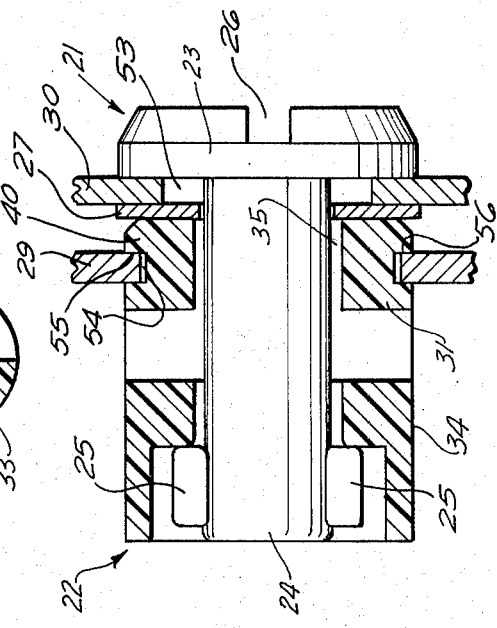

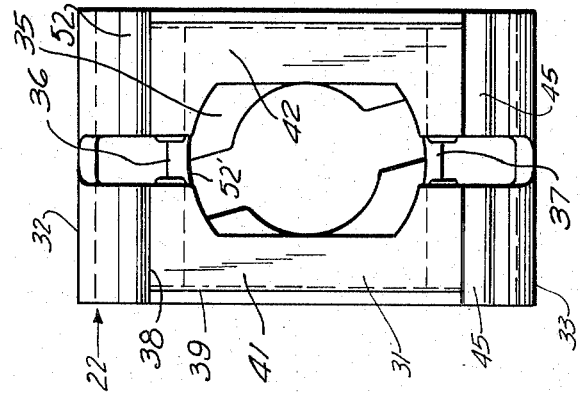
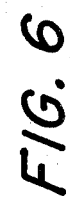
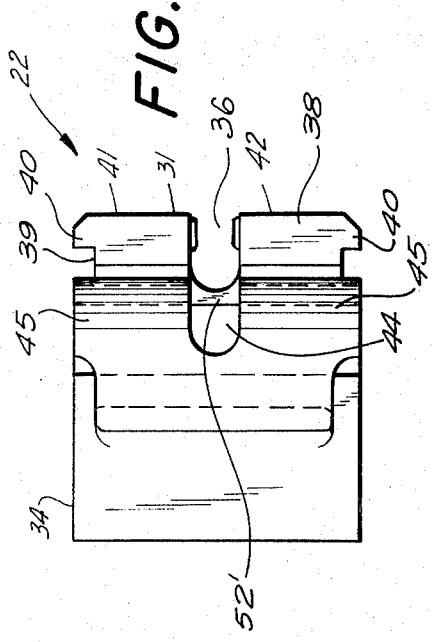
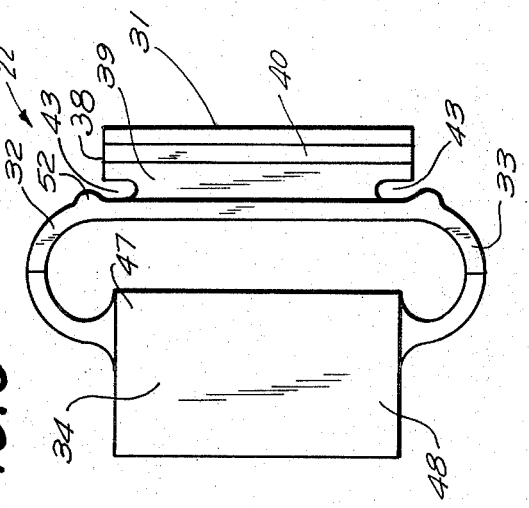
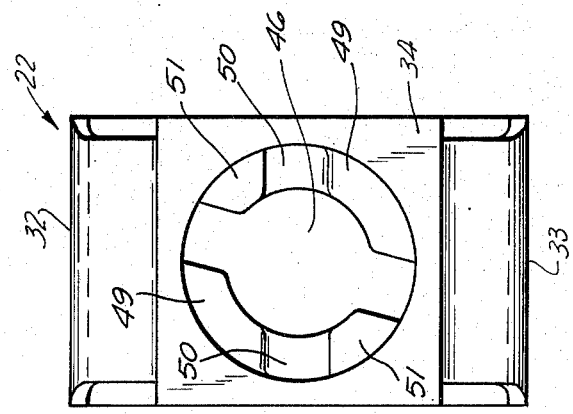

FASTENER

BACKGROUND OF THE INVENTION

When fastening two members together such as a pair of adjacent panels, it is often desirable to utilize a quick release fastener. In such an environment a fastener which is of low cost and which may be quickly and efficiently installed in the panels is extremely advantageous particularly in mass use. A device of this type is disclosed in U.S. Pat. No. 3,486,205 issued on Dec. 30, 1969. The fastener disclosed in that reference is extremely useful and is sucessfully applied in the fastener field.

There are several areas of design in which that type of fastener can be adapted for more versatile uses. For example in certain instances, it is desirable to provide a fastener of minimum dimensions particularly in areas where space is not readily available. Naturally, in certain situations the cost savings of reducing the amount of material required for the fastener receptacle are also of value. In environments where installation time is critical a receptacle should be provided which may be quickly positioned within the panel installation in the fastest and most efficient manner while retaining the locking features of the receptacle to protect against inadvertent displacement of the receptacle from its mounted position during use.

A receptacle which would provide satisfactory solutions to the above requirements as well as retaining the advantages of the fastener as disclosed in the above referenced patent including versatility and adaptability to a number of different thickness panels with one size receptacle would provide another extremely useful fastener for the known art.

SUMMARY OF THE INVENTION

Thus, with the above thoughts in mind, it is among the primary objectives of the present invention to provide a fastener which utilizes a minimum size receptacle adapted to be mounted in a quick and efficient manner in a number of different thickness panels for engagement with a stud assembly to provide a quick release fastener assembly for interconnecting two support members such as a pair of adjacent panels.

In summary, a fastener assembly is provided for use with a fastener stud of the type having a shank portion and a cross-arm. The receptacle includes a unitary member made of resilient plastic material which has a base portion for mounting on a support formed with a central aperture for receiving the shank portion of the stud. A pair of resilient C-shaped loop portions extend outwardly from opposite ends of the base portion. A retaining portion is integrally secured to the outer ends of the C-shaped loop portions and normally is held in spaced relationship thereby from the base portion but is shiftable against the resilient force exerted by the loop portions toward the base portion. The retaining portion has a central aperture with cam surfaces formed therein to receive and engage the cross-arm on the shank of the stud. The retaining portion is provided with a collar-like flange portion surrounding the aperture and projecting toward the base portion. Therefore, when the crossarm of the stud is engaged with the cam surfaces in the aperture and a force in tension is exerted between the fastener stud and the receptacle relative movement of the retaining portion of the receptacle toward the base portion is limited by engagement of the flange portion with the base portion. Mounting means are on the member to facilitate connection to the support. Finally, the base portion has a reduced part adjacent to the loop portions to cooperate with the loop portions in providing a member adapted to be mounted to a variety of different size supports.

With the above objectives, among others, in mind, reference is had to the attached drawings.

BRIEF DESCRIPTION OF THE DRAWINGS

In the drawings:

FIG. 1 is an exploded view of the fastener of the invention with the receptacle portion shown in a sectional view;

FIG. 2 is a side elevation view thereof showing the fastener holding two panels together;

FIG. 3 is a side elevation view of the receptacle portion of the fastener of the assembly;

FIG. 4 is an end view thereof;

FIG. 5 is a bottom plan view thereof;

FIG. 6 is a top plan view thereof; and

FIG. 7 is a fragmentary sectional view taken along the plane of line 7-7 of FIG. 1.

DESCRIPTION OF THE PREFERRED EMBODIMENT

As shown in FIGS. 1 and 2, fastener 20 includes stud assembly 21 and receptacle 22. Stud 21 has an enlarged head 23 and a shaft 24 extending therefrom. Adjacent the end of the shaft 24 distal from head 23 are a pair of opposed lateral cross-arms 25. A slot 26 is positioned in the rear surface of head 23 to facilitate rotation of stud assembly 21 between the locked and unlocked positions. A removable washer 27 is positioned about shaft 24. An opening 28 is provided on the surface of washer 27 to permit it to be removed and extended laterally about shaft 24. The washer is of a resilient material to permit its removal and placement about shaft 24 in a convenient manner.

All of the components of fastener assembly 20 may be constructed of a substantially rigid plastic material with portions of receptacle 22 being weakened to provide a desired amount of flexibility to the receptacle as will be discussed in detail below.

Fastener assembly is utilized for fastening two separate support members together as shown, for example, in FIG. 2 where panels 29 and 30 are held in fixed position with respect to one another by the assembly between receptacle 22 and stud 21. Receptacle 22 is a one-piece molded plastic member including a base 31 integral with a pair of opposed C-shaped loop portions 32 and 33 which in turn are integral at their other end to a retaining portion 34. Base 31 includes a central aperture 35 to receive stud shaft 24 on a pair of opposed notches 36 and 37 providing communication between central aperture 35 and the lateral sides 38 of base 31. The longitudinal sides 39 of base 31 each having a retaining lip 40 extending along their entire length. Notches 36 and 37 separate head 31 into two longitudinal side portions 41 and 42 which may be directed toward one another into the space provided by notches 36 and 37 and aperture 31 when forces are applied to the longitudinal sides of head 31.

Lateral sides 38 of base 31 are each undercut to provide opposed recesses 43 as shown, the beginning portion of loops 32 and 33 form the undersurface of each recess 43 respectively. Adjacent to recesses 43 are a pair of centrally located slots 44 with one slot located on the upper cylindrical surface of loop 32 and the other slot 44 located on the upper cylindrical surface of loop 33. Slots 44 communicate with notches 36 and 37 respectively in base 31. Therefore each notch 44 provides a zone of weakness for loops 32 and 33 and separate loops 32 and 33 into a pair of opposed portions 45 whereby each portion 45 may be compressed toward the other portion 45 and cooperate with notches 36 and 37 to permit portions 41 and 42 of base 31 to be directed toward one another thereby diminishing the width of head 31 and permitting its insertion into a support aperture.

Retaining portion 34 is substantially rectangular in configuration and has a central aperture 46 in which to receive the forward end of shaft 24 including cross-arms 25. Loops 32 and 33 terminate and are integral with the end walls of retaining portion 34 intermediate the depth of retaining portion 34. In this manner, a flange or collar 47 is formed above the point of connection to loops 32 and 33 and is directed toward base 31. A similar flange or collar 48 extends in the opposing direction and is integral with collar 47. Collar 48 enlarges retainer 34 to permit its acceptance of shaft 24 and cross-arm 25.

A pair of opposing similar cam surfaces 49 are positioned interiorly of retainer portion 34 so as to receive and be engaged by cross-arms 25. The opposing cam surfaces each terminate in a locking detent 50 adjacent to a locking post 51 also on the interior surface of retainer 34. As shown, retainer portion 34 has a central opening therethrough to accommodate the stud.

Loops 32 and 33 are of relatively thin cross-section to provide flexibility for receptacle 22 due to the inherent nature of the plastic material. The flexible nature of the material in thin cross-section in addition to the separation of head 31 formed by notches 36 and 37 and the separation of loops 32 and 33 formed by slots 44 permit receptacle 22 to be deformed so that it may be properly positioned on a support. Once the receptacle has been properly positioned on the support and released, the resilient nature of the plastic material aided by a pair of transverse reinforcing ribs 52' provided across the notches 44. Each rib 52' is vertically aligned with one of the notches 36 and 37 in the base. In this position rib 52' form stiffener spring-like reinforcement elements to assist in returning the base to its normal configuration and retaining it in that condition. In this manner, the receptacle is locked in position and inadvertent displacement of receptacle 32 from its fixed position is minimized.

As discussed above, the component parts of fastener 20 which includes stud 21, washer 27 and receptacle 22 can be easily and efficiently molded of an inexpensive plastic material to provide a unit which can be manufactured on a mass scale at low cost. Similarly, the design features of the receptacle 22, in particular, make assembly of fastener 20 more efficient in on-site use. By providing loops 32 and 33 of minimum cross-section, the size of the loops can be reduced and the over-all size of receptacle 20 can be substantially reduced. This provides the advantage of savings in material cost as well as minimizing the amount of space needed on location for the receptacle.

In actual assembly as shown in FIG. 2 where a pair of panels 29 and 30 are to be fastened together in a quick lock and release type manner, washer 27 is removed from shaft 24 and the shaft is placed through an aperture 53 in panel 30. The aperture 53 is large enough to permit passage of cross-arms 25 therethrough. Thereafter flexible washer 27 may be expanded due to the presence of interruption 28 so that it can be extended over shaft 24 with panel 30 housed between the washer and the undersurface of head 23. Release of washer 27 permits the resilient plastic washer to return to its initial configuration about shaft 24 and to retain stud 21 in fixed position on panel 30.

Panel 29 has an aperture 54 therein which is of sufficient diameter to permit passage of head 31 therethrough when receptacle 22 has been deformed by pressing head portions 41 and 42 toward one another. This action is facilitated by the presence of slots 44 in loops 32 and 33 which permit rapid and easy deformation of receptacle 22 until head 31 will pass through aperture 54. Ribs 52' will bend under the bias placed thereon when the head portions are deformed. Thereafter, halves 41 and 42 of head 31 can be released and the resilient plastic receptacle will return to its initial configuration and snap into position with the undersurface 55 of lips 40 in retaining engagement with the outer surface 56 of panel 29. Reinforcing ribs 52' assist in the return of the head to its normal configuration. Also the bias therein is released and the bent ribs return to the relaxed position. The ribs also give added strength to the receptacle in its relaxed position with head 31 fully opened so that accidental compression of the halves of head 31 during operation of the fastener is minimized and substantially eliminated.

Panels 29 and 30 are then brought into alignment and stud 24 is inserted through apertures 35 and 46 in receptacle 22 until cross-arms 25 come into engagement with cam surfaces 49. An appropriate tool may then be inserted into slot 26 in the head of stud 21 and the stud rotated a predetermined distance such as a quarter turn depending upon the length of cam surface 49 until cross-arm 25 travels along cam surface 49 and into locking detent 50 adjacent to locking post 51. This occurs simultaneously with respect to each cross-arm 25 and corresponding cam surface 49, locking detent 50 and post 51.

During the travel of each cross-arm 25 along cam surface 49 receptacle 22 is deformed and loops 32 and 33 are collapsed so that collar 47 approaches head 31. This provides a tension force and keeps the panels in fixed relation with respect to one another. Additionally, the deformation of loops 32 and 33 permits the upper surface of the loops to deform into interengagement with the undersurface of panel 29 so that the receptacle conforms to the thickness of panel 29 and eliminates a loose interengagement between panel 29 and receptacle 22. In this manner, a variety of different thickness panels 29 and 30 can be employed with the difference in panel thickness being compensated for by the deformation versatility of loops 32 and 33. To facilitate the deformation action of loops 32 and 33 until they come into engagement with the undersurface of a variety of different thickness panels 29, undercuts 43 in head portion 31 provide a greater upper surface area for loops 32 and 33 so that the loops have maximum freedom to deform and engage with the undersurface of an appropriate panel. The greater free upper surface area of the loops permit a greater dimensional alteration when stud 21 rotated into the locked position. Therefore, a tight surface-to-surface engagement is achieved between receptacle 22 and panel 29 with a great variation in the cross-sectional thickness of panel 29 being permitted. A projection 52 is provided on the upper surface of each loop part 45 spaced from the undercuts to engage with panel 29 and to provided added assurance that tight interengagement between the fastener and the panels is achieved upon final assembly regardless of panel thickness.

To unlock the fastener, all that is necessary is rotation of the stud in the opposite direction to move crossarms out of detents 50 along cam surfaces 49 into the disengagement position at which time the stud can be withdrawn from the receptacle and panels 29 and 30 separated. If desired, the receptacle can be removed from panel 29 by a similar procedure as the insertion procedure. In that fashion, halves 41 and 42 of head 31 can be compressed toward one another until head 31 passes through aperture 54 in panel 29 thereby removing the receptacle from panel 29. Similarly, washer 27 can easily be removed from shaft 24 of stud 21 and the stud can be withdrawn through aperture 53 and panel 30.

Thus, the above discussed objectives of the invention, among others, are effectively attained.

We claim:

1. A fastener receptacle for use with a fastener stud of the type having a shank portion and a crossarm, said receptacle comprising:
    a unitary member made of resilient plastic material and having a base portion for mounting on a support formed with a central aperture for receiving the shank portion of the stud;
    a pair of resilient C-shaped loop portions extending outwardly from opposite ends of the base portion;

a retaining portion integrally secured to the outer ends of the C-shaped loop portions and normally held in spaced relationship thereby from the base portion but shiftable against the resilient force exerted by the loop portions toward the base portion;

said retaining portion having a central aperture with cam surfaces formed therein to receive and engage the cross-arm on the shank of the stud and being provided with a collar-like flange portion surrounding the aperture and projecting toward the base portion whereby when the cross-arm of the stud is engaged with the cam surfaces in the aperture and a force in tension is exerted between the fastener stud and the receptacle relative movement of the retaining portion of the receptacle toward the base portion is limited by engagement of the flange portion with the base portion;
    mounting means on said member to facilitate connection to a support;
    a body portion having a reduced part adjacent to the loop portions to cooperate with the loop portions in providing a member adapted to be mounted to a variety of different thickness supports; and
    the mounting means including a pair of opposed centrally located slots in the C-shaped loop portions and a pair of corresponding slots in the base portion to permit the portions of the base and loops on opposed sides of the respective slots to be forced toward one another thereby reducing the width thereof and facilitating positioning of the member in the central aperture of a support whereupon release of the resilient member will permit the base and C-shaped loop portions to return to their normal configuration with the member mounted on the support.

2. The invention in accordance with claim 1 wherein transverse ribs are positioned across at least one pair of the pair of slots in the base and the pair of slots in the loop portion to assist in rigidifying the member and retaining the member in the normal position when mounted on the support.

3. A fastener receptacle for use with a fastener stud of the type having a shank portion and a cross-arm, said receptacle comprising;
    a unitary member made of resilient plastic material and having a base portion for mounting on a support formed with a central aperture for receiving the shank portion of the stud;
    a pair of resilient C-shaped loop portions extending outwardly from opposite ends of the base portion;

a retaining portion integrally secured to the outer ends of the C-shaped loop portions and normally held in spaced relationship thereby from the base portion but shiftable against the resilient force exerted by the loop portions toward the base portion;

said retaining portion having a central aperture with cam surfaces formed therein to receive and engage the cross-arm on the shank of the stud and being provided with a collar-like flange portion surrounding the aperture and projecting toward the base portion whereby when the cross-arm of the stud is engaged with the cam surfaces in the aperture and a force in tension is exerted between the fastener stud and the receptacle relative movement of the retaining portion of the receptacle toward the base portion is limited by engagement of the flange portion with the base portion;
    mounting means on said member to facilitate connection to a support;
    a body portion having a reduced part adjacent to the loop portions to cooperate with the loop portions in providing a member adapted to be mounted to a variety of different thickness supports; and
    the reduced portion on the body being formed by a pair of opposed undercuts on the body portion at the location where the body portion meets the C-shaped loops to thereby increase the distance between the point of engagement of the base and each C-shaped loop and the outer upper surface of each loop.

4. The invention in accordance with claim 3 wherein a plurality of projections extend from the upper surface of the loops spaced from the body to cooperate with the undercuts on the body portion in facilitating rigid interengagement between the member and a variety of different thickness panels.

5. The invention in accordance with claim 3 wherein each of the C-shaped loops extends from the ends of the base a distance substantially less than the width of the base thereby providing a compact fastener receptacle of minimum size.

6. The invention in accordance with claim 3 wherein the collar-like flange projects toward and away from the base portion from the point of engagement between the retaining portion and the outer ends of the C-shaped loop portions to facilitate accommodation of the stud while retaining minimum dimensional requirements for extension of the C-shaped loop portions.

* * * * *